United States Patent [19]

Beasley

[11] Patent Number: 4,725,115
[45] Date of Patent: Feb. 16, 1988

[54] MULTI-MODE, OPTICAL FIBER LASER COUPLER

[75] Inventor: J. Donald Beasley, Arlington Heights, Ill.

[73] Assignee: Gould Inc., Rolling Meadows, Ill.

[21] Appl. No.: 762,190

[22] Filed: Aug. 5, 1985

[51] Int. Cl.⁴ ............................................. G02B 6/32
[52] U.S. Cl. .................................. 350/96.18; 350/96.15
[58] Field of Search ............... 350/96.15, 96.18, 96.20, 350/96.21, 96.22; 250/227

[56] References Cited

U.S. PATENT DOCUMENTS

| | | | |
|---|---|---|---|
| 4,257,672 | 3/1981 | Balliet | 350/96.18 X |
| 4,268,112 | 5/1981 | Peterson | 350/96.18 |
| 4,327,963 | 5/1982 | Khoe et al. | 350/96.18 |
| 4,575,194 | 3/1986 | Streifer et al. | 350/96.18 X |
| 4,611,884 | 9/1986 | Roberts | 350/96.15 |

Primary Examiner—William L. Sikes
Assistant Examiner—Frank González

[57] ABSTRACT

An apparatus for efficiently coupling laser light to multi-mode fiber uses a solid state laser focussed by a spherical microlens onto a partially reflecting mirror. The mirror is formed by polishing the ends of two fibers at 45 degrees and assembling them such that the ends abut and are substantially parallel. High efficiency is obtained by using the spherical lens to direct most of the laser light into the acceptance cone of the fiber and by orienting the laser such that the electric vector of the light is perpendicular to the fiber axis.

8 Claims, 4 Drawing Figures

MULTI-MODE, OPTICAL FIBER LASER COUPLER

BACKGROUND OF THE INVENTION

This invention relates generally to an optical coupler for launching laser light into a multi-mode optical fiber. Present methods for launching laser light into a multi-mode fiber bus include a fused multi-mode four-port star coupler and polished and cemented junctions. Another multi-mode coupler involves the modification of a PIN-TAP TM device (manufactured by ADC Magnetic Controls Company of Minneapolis, Minn.). A PIN-TAP TM device consists generally of a fiber optic bus having a partially reflecting mirror positioned at about a 45 degree angle to the core axis in a multi-mode fiber. Light traveling down the multi-mode fiber is partially reflected at the mirror to a PIN diode where it is converted into an electrical signal. A reverse PIN-TAP coupler is obtained by modifying the PIN-TAP device by replacing the PIN diode with a laser diode and a lens. The lens focuses the laser light onto the partially reflecting mirror and into the multi-mode fiber bus.

The major drawback to the star coupler is modal noise for small coupling ratios, and for the polished and cemented junction is additionally the lack of stability of the optical coupling ratio. The reverse PIN-TAP type coupler overcomes the modal noise problem with the partially reflecting mirror which injects light into many possible modes simultaneously. The desired amount of light injected into the fiber bus is determined by the percent of light reflected at the mirror. However, each of the three types of couplers has a very large loss in signal strength for either the injected signal or the signal travelling in the bus. Depending on the number of stations or couplers in a particular application, the optmum degree of reflectivity can range from 0.1% to 50%. For example, a partially reflective mirror chosen to inject only about one percent (1%) of the input laser energy transmits about 99% of the optical power in the fiber bus. Low overall coupling efficiency is required in order to keep insertion loss low for the signals in a fiber bus having many such couplers.

The present reverse PIN-TAP coupler is a design capable of injecting only about 8% of the input laser energy ideally reflected from the mirror. Therefore, it is an object of the present invention to provide a multi-mode coupler, with nearly 100% of the coupling efficiency permitted by the chosen mirror's reflectivity, for launching laser light into a multi-mode fiber.

It is another object of the present invention to provide an efficient, low-loss means to couple laser light into a multi-mode fiber bus.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects, and in accordance with the purposes of the present invention, apparatus for coupling laser light to a multi-mode optical fiber may comprise: a first multi-mode optical fiber having a first end, said first end having been cut at about a 45 degree angle to said first fiber axis; a second multi-mode optical fiber having a first end, said second first end having been cut at about a 45 degree angle to said second fiber axis; said first and second fibers being axially aligned such that said first ends abut one another and the faces of said first ends are substantially parallel to one another; partial reflection means positioned between the faces of said first ends; and a lens positioned from said first ends and said partial reflection means at a distance such that said lens directs the maximum amount of laser light output into the acceptance cone of the core of said first or second fiber; wherein the laser light is polarized such that the electric vector of the laser light is perpendicular to said fiber axes.

BRIEF DESCRIPTION OF THE DRAWINGS

The foregoing invention is illustrated in the drawings wherein.

DETAILED DESCRIPTION OF THE INVENTION

Figure 2:
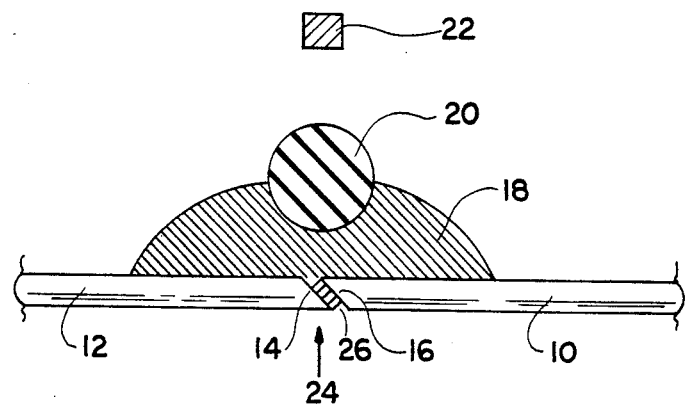
FIG. 2 is a cross-section along line 2—2 of the coupler of FIG. 1.
Figure 1:
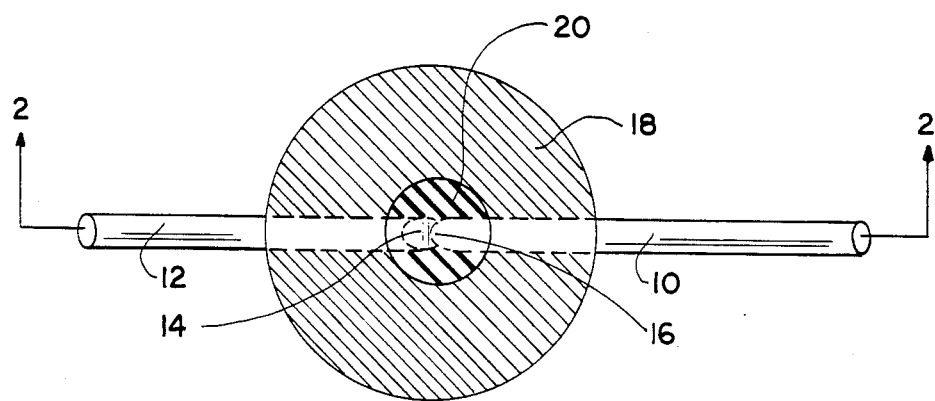
FIG. 1 is a schematic top view of a multi-mode coupler.

Referring to FIGS. 1 and 2, a multi-mode coupler according to the present invention includes a fiber bus 24. Fiber bus 24 includes multi-mode fibers 10 and 12 and a partial reflection means 26 positioned therebetween. Fibers 10 and 12 have, respectively, ends 16 and 14 which have been cut at about a 45 degree angle to their respective fiber axes. Fibers 10 and 12 are axially aligned such that the faces of ends 16 and 14 are parallel to one another. The partial reflection means 26 is positioned between the parallel aligned faces. This is accomplished in any of several ways: ends 16 and 14 can be polished to form a mirror at the surface or coated with a partially reflective material; a partially reflective mirror or a material having an index of refraction different from the fibers can be inserted between the two faces. The degree of reflectivity of the material determines the amount of light transmitted down the fibers from the laser-lens combination. Lens 20 is located accurately at a distance from ends 16 and 14 such that the maximum amount of optical energy from laser diode 22 is directed into the acceptance cone of the core of fiber 10. Optical cement 18 provides structural support and maintains this critical distance.

Ray-tracing analyses of optical coupling between the laser and the fiber indicate that an optical design using a microsphere for focusing the light from a solid state laser diode can be more efficient than placing the diode against the fiber. The spherical aberration of the micro-lens distributes light energy among the various modes in the fiber. The use of a microspherical lens allows, in addition, the retention of the epoxy potting material which surrounds and stabilizes the fiber bus assembly (fibers 10 and 12 with partial reflection means between ends 16 and 14).

Figure 3:
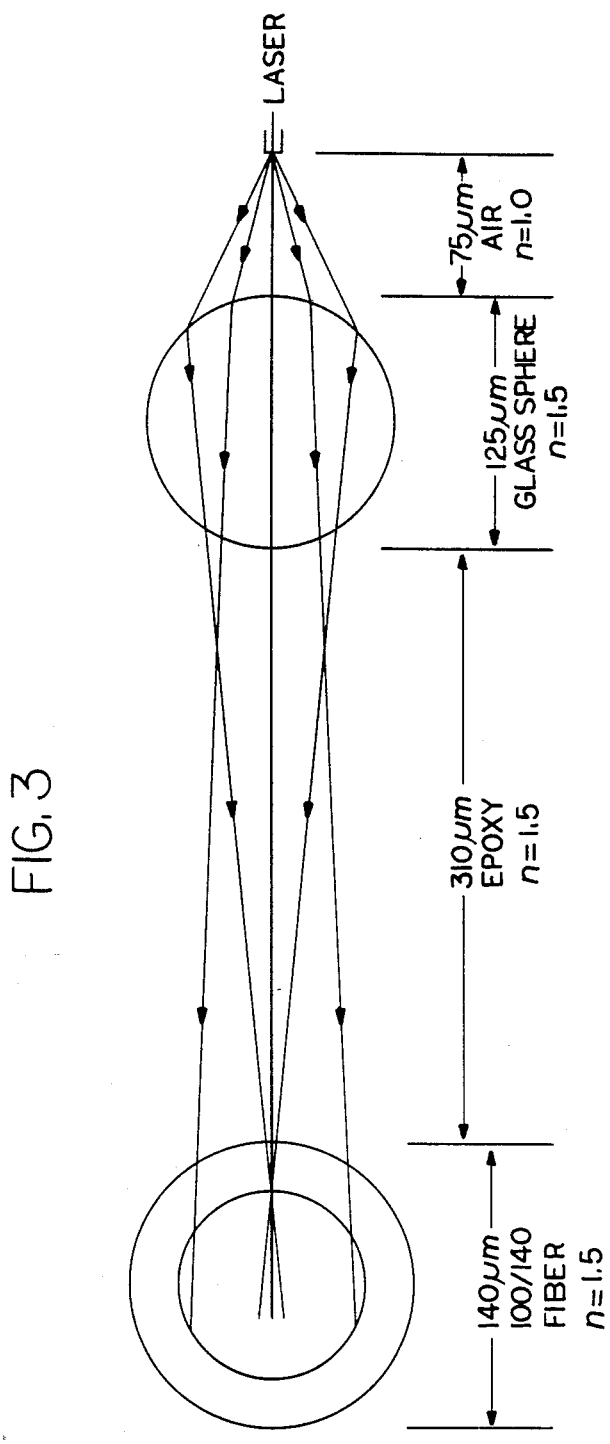
FIG. 3 is an optical ray diagram for a 125 micrometer diameter glass lens and a 140 micrometer diameter multi-mode fiber.
Figure 4:
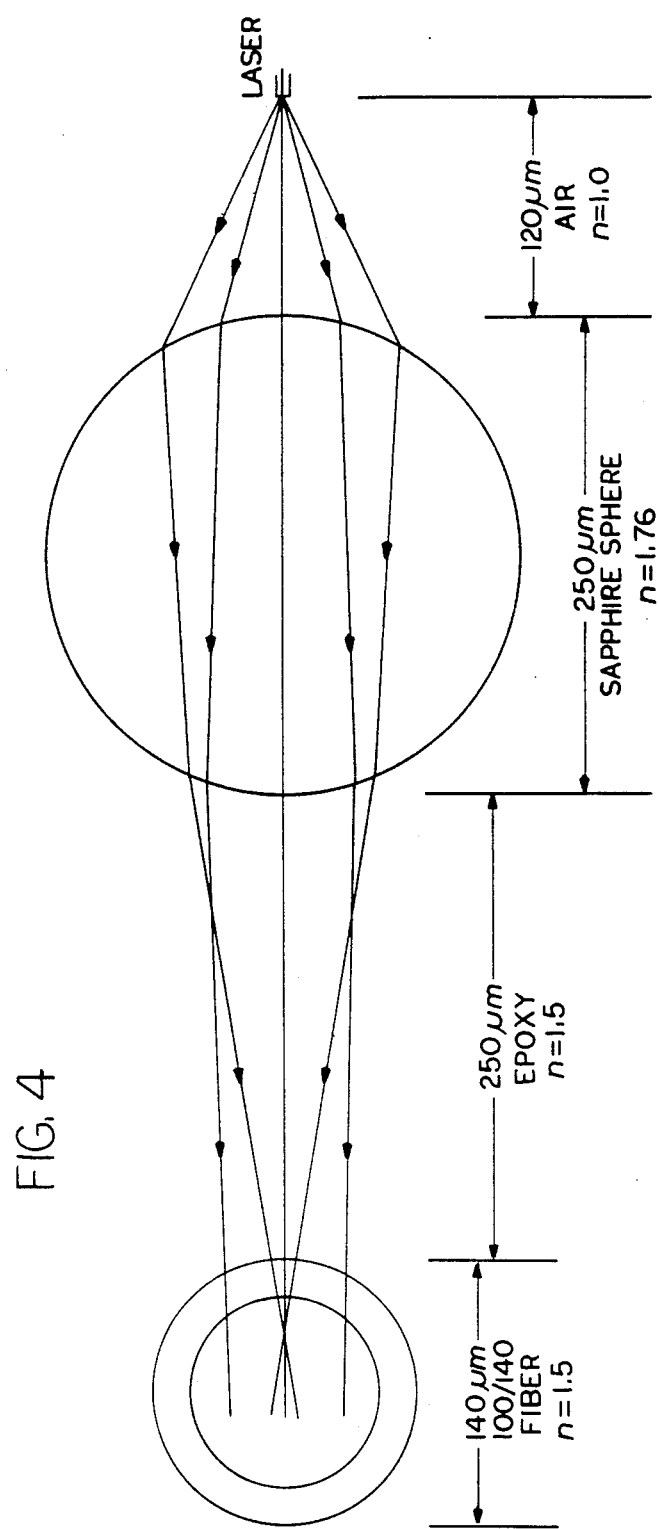
FIG. 4 is an optical ray diagram for a 250 micrometer diameter sapphire lens and a 140 micrometer diameter multi-mode fiber.

The analysis was done by graphic ray tracing studies of various alternative designs. Two possible optical structures are shown in FIGS. 3 and 4. In FIG. 3, the optimum distance for a soda-lime glass lens (n=1.5) of 125 micrometer diameter to a 140 micrometer diameter fiber is shown to be 310 micrometers. In FIG. 4 the optimum distance for a sapphire lens (n=1.76) of 250 micrometer diameter to a 140 micrometer diameter fiber is shown to be 250 micrometers. The higher optical index of sapphire compared to soda-lime glass permits the use of a spherical lens of larger radius, which results in less spherical aberration than is produced by a soda-lime glass sphere of similar optical power. Either type of lens, however, permits the injection of more than 50% of the laser power into a 100/140 fiber having an N.A. of 0.29. Both types of lenses, configured as shown in FIGS. 3 and 4, cause light to be reflected back into the laser to about the same degree. The light reflected is about 100 times more than is reflected into the laser from the window in the hermetic package of for example, an Amperex CQL10A laser, but even that amount does not affect the operation of a gain-guided laser such as the Amperex CQL10A. The amount of reflected light could be reduced by adding an antireflection coating to the surface of either type of spherical lens.

Coupling of a laser diode to the fiber bus structure requires opening the hermetic laser package and cementing a fiber bus supporting substrate with the laser into a composite package, with positioning controlled by a suitable micromanipulator.

It has been found that the multi-mode coupler is sensitive to the direction of polarization of the light focused into it from the laser diode. With the electric vector perpendicular to the fiber, four times as much light was introduced into the fiber through a 1% reflective means, compared with the amount of light introduced or launched into the fiber when the electric vector was aligned along the direction of the fiber.

Since the light from solid state lasers is usually significantly polarized (as much as ten to one for light in the two perpendicular polarizations), orientation of the lasers for optimum setting of the light polarization is important when using the invention for laser light coupling into optical fibers.

The polarization sensitivity of the coupler may be used to advantage since light having a randomized polarization passing a reverse PINTAP TM via the fiber pigtails will suffer about half the loss, for a given laser injection efficiency with optimized polarization, compared to that which would be possible if there were no polarization sensitivity.

For revese PINTAP TM devices with larger percentage reflection ratios, such as 10% or 50%, the sensitivity to polarization is expected to be reduced because the reflecting surfaces are formed by multi-layer dielectric coatings or metallization. The 1% partial reflection means are, on the other hand, preferably formed by Fresnel reflections at interfaces between media with differing indicies of refraction.

EXAMPLE

A multi-mode optical fiber coupler was fabricated using a 250 micrometer diameter sapphire lens mounted on a built-up mound of cured Norland 81 optical cement providing a spacing of 250 micrometers to the 140 micrometer diameter fiber bus. For a 1% coupler (1% partial reflection means) having a lens-diode spacing of 100 micrometers, laser input of 190 W, diode current of 0.9330 mA, drive current of 88.1 mA, 0.85% injection (85% theoretical efficiency) was obtained.

Although the invention has been described and illustrated in detail, it is to be understood that the same is by way of illustration and example only, and is not to be taken by way of limitation; the spirit and scope of this invention being limited only by the appended claims.

What is claimed is:

1. Apparatus for coupling laser light to a multi-mode optical fiber comprising:
    a first multi-mode optical fiber having a first end, said first end cut at approximately a 45 degree angle with respect to said first fiber axis;
    a second multi-mode optical fiber having a first end, said first end of said second fiber cut at approximately a 45 degree angle with respect to said second fiber axis;
    said first and second fibers being axially aligned such that said first ends are adjacent and substantially parallel to one another;
    partial reflection means positioned between said first ends of said first and second fibers; and
    a lens positioned above and substantially perpendicular to said first ends and said partial reflection means at a distance such that said lens directs maximum light from a laser into an acceptance cone of a core of one of said first and second fibers, the laser light being polarized such that an electric vector of the laser light is perpendicular to said first and second fiber axes.

2. The apparatus of claim 1 wherein said lens is spherical.

3. The apparatus of claim 2 wherein said lens is formed of sapphire.

4. The apparatus of claim 3 wherein said lens has a higher index of refraction than said fibers.

5. The apparatus of claim 1 wherein said partial reflection means comprises a mirror.

6. The apparatus of claim 1 wherein said partial reflection means comprises a reflective coating on said first ends.

7. The apparatus of claim 1 wherein said partial reflection means comprises polished faces of said first ends.

8. The apparatus of claim 1 wherein said partial reflection means comprises a material having an index of refraction different from said fibers.

* * * * *